(12) United States Patent
Gupta et al.

(10) Patent No.: US 7,356,542 B2
(45) Date of Patent: Apr. 8, 2008

(54) DML STATEMENTS FOR DENSIFYING DATA

(75) Inventors: Abhinav Gupta, Santa Clara, CA (US); Lei Sheng, Foster City, CA (US); Sankar Subramanian, Cupertino, CA (US); Nathan Folkert, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 523 days.

(21) Appl. No.: 10/796,217

(22) Filed: Mar. 8, 2004

(65) Prior Publication Data

US 2005/0044102 A1 Feb. 24, 2005

Related U.S. Application Data

(60) Provisional application No. 60/497,111, filed on Aug. 22, 2003, provisional application No. 60/499,078, filed on Aug. 28, 2003.

(51) Int. Cl.
*G06F 17/00* (2006.01)
*G06F 7/00* (2006.01)

(52) U.S. Cl. ................................. 707/102; 707/103 Y

(58) Field of Classification Search ................ 707/102, 707/103 Y
See application file for complete search history.

(56) References Cited

U.S. PATENT DOCUMENTS

| | | | | |
|---|---|---|---|---|
| 5,423,035 A * | 6/1995 | DePrez | ........................... | 707/2 |
| 5,557,791 A | 9/1996 | Cheng et al. | | |
| 5,905,985 A * | 5/1999 | Malloy et al. | ............... | 707/100 |
| 5,991,754 A * | 11/1999 | Raitto et al. | .................... | 707/2 |
| 6,073,134 A * | 6/2000 | Shoup et al. | ................ | 707/100 |
| 6,112,198 A | 8/2000 | Lohman et al. | | |
| 6,298,342 B1 * | 10/2001 | Graefe et al. | ................... | 707/4 |
| 6,345,272 B1 * | 2/2002 | Witkowski et al. | ............. | 707/4 |
| 6,397,204 B1 * | 5/2002 | Liu et al. | ......................... | 707/2 |
| 6,397,214 B1 | 5/2002 | Rogers | | |
| 6,446,063 B1 * | 9/2002 | Chen et al. | ..................... | 707/4 |
| 6,625,593 B1 * | 9/2003 | Leung et al. | ................... | 707/2 |
| 6,665,663 B2 * | 12/2003 | Lindsay et al. | ................. | 707/4 |
| 2002/0078018 A1 * | 6/2002 | Tse et al. | ......................... | 707/1 |
| 2002/0194163 A1 * | 12/2002 | Hopeman et al. | ............... | 707/3 |

FOREIGN PATENT DOCUMENTS

WO    WO 2005/020105 A1    3/2005

OTHER PUBLICATIONS

Codd, E. F., et al., "Extending the Database Relational Model to Capture More Meaning", ACM Transactions on Database Systems, vol. 4, No. 4, Dec. 1979, pp. 397-434.*

(Continued)

*Primary Examiner*—Shahid Alam
*Assistant Examiner*—Robert Stevens
(74) *Attorney, Agent, or Firm*—Hickman Palermo Troung & Becker LLP; Christian Nicholes

(57) ABSTRACT

A method and apparatus for densification of data is provided. A method and apparatus for including a construct for partitioning data within a DML statement is provided. The construct for partitioning data may not necessarily perform a densification of data, and the densification of data may not necessarily include a construct for partitioning data. In an embodiment, the syntax of an OUTER JOIN is extended to include a PARTITION BY construct that may be used for data densification.

33 Claims, 6 Drawing Sheets

OTHER PUBLICATIONS

Theodoratos, Dimitri, et al., "Heuristic Optimization of OLAP Queries in Multidimensionally Hierarchically Clustered Databases", DOLAP '01, Atlanta, GA, Nov. 9, 2001, pp. 48-55.*

Hurtado, Carlos A., et al., "Updating OLAP Dimensions", DOLAP '99, Kansas City, MO,® 1999, pp. 60-66.*

Nemic, Jaromir D.B., "Partitioned Outer Join", Jul. 1, 2004, pp. 1-7 (downloaded from: www.db-nemec.com/Partitioned_outer_join.html).*

International Preliminary Report on Patentability from PCT Patent Application No. PCT/US2004/027406 (13 pgs.), Aug. 19, 2004.

International Search Report and Written Opinion from PCT Patent Application No. PCT/US2004/027406 (13 pgs.), Dec. 13, 2004.

Current Claims in PCT Patent Application No. PCT/US2004/027406 (8 pgs), Feb. 15, 2005.

Witkowski, A., et al. "Spreadsheets in RDBMS for OLAP" Proceedings of the ACM SIGMOD 2003 Conference, Jun. 9, 2003, pp. 52-63.

Gupta, A., et al. "Data Densification in a Relational Database System" Proceedings of the ACM SIGMOD 2004 Conference, Jun. 13, 2004, entire document.

Graefe, G. "Query Evaluation Techniques For Large Databases" ACM Computing Surveys USA, vol. 25, No. 2, Jun. 1993, pp. 73-170.

Chaudhuri, S., et al. "An Overview Of Data Warehousing And OLAP Technology" SIGMOD Record, SIGMOD, New York, NY, US, vol. 26, No. 1, Mar. 1997, pp. 65-74.

Jaedicke, Michael, et al. "User-Defined Table Operators: Enhancing Extensibility for ORDBMS" Proceedings of 25$^{th}$ VLDB Conference, Edinburgh, Scotland, Sep. 7, 1999, pp. 494-505.

Chaudhuri, S., "An Overview Of Query Optimization In Relational Systems" Proceedings of the 17$^{th}$ ACM SIGACT-SIGMOD-SIGART Symposium on Principles of Database Systems, PODS 1998, Seattle, WA, Jun. 1-3, 1998; Proceedings of the ACM SIGACT-SIGMOD-SIGART Symposium on Principles of Database Systems, New York, NY, Jun. 1, 1998, pp. 34-43.

* cited by examiner

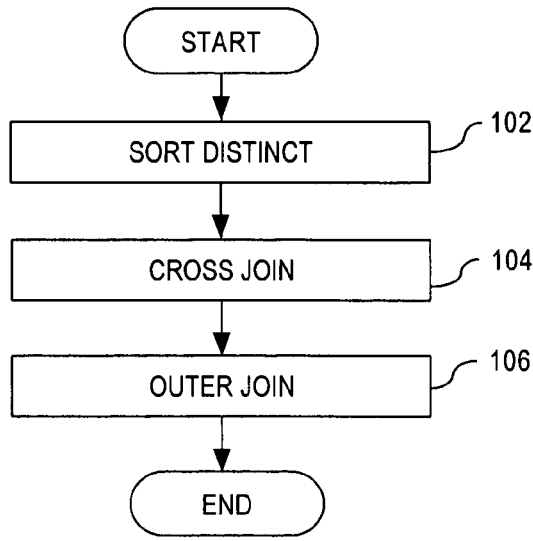
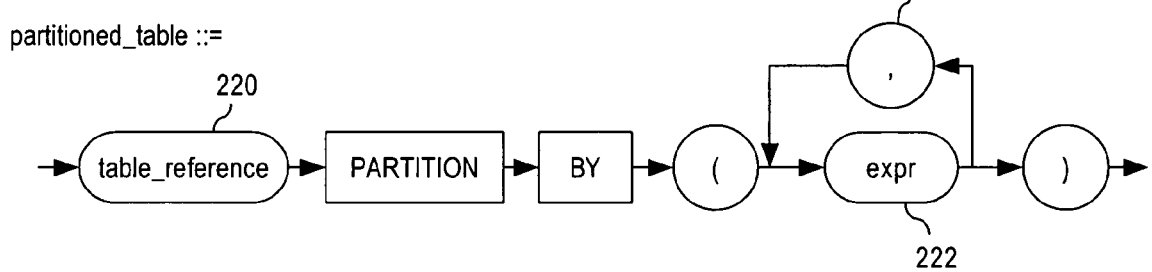
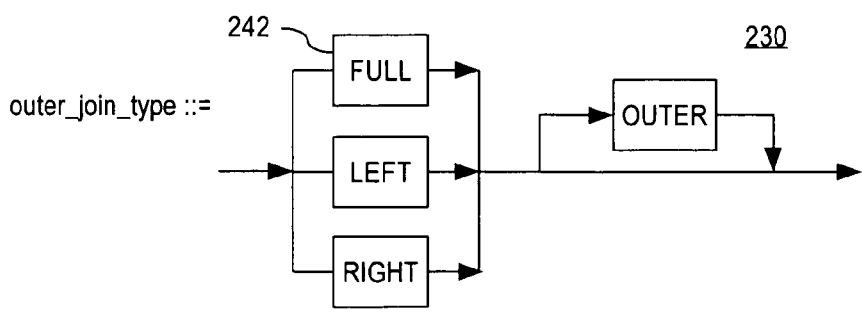

DML STATEMENTS FOR DENSIFYING DATA

CROSS-REFERENCE TO RELATED APPLICATIONS; PRIORITY CLAIM

This application claims benefit of prior U.S. Provisional Application 60/497,111, filed Aug. 22, 2003, and prior U.S. Provisional Application 60/499,078, filed Aug. 28, 2003, the entire contents of which are hereby incorporated by reference as if fully set forth herein under 35 U.S.C. § 119(e).

FIELD OF THE INVENTION

The present invention relates to data manipulation. More specifically, the present invention relates to techniques for densifying a set of data relative to one or more dimensions.

BACKGROUND OF THE INVENTION

The term "dimension" refers to a related set of distinct values. For example, a TIMES dimension can include all dates from January 1998 to December 2003. Similarly, a PRODUCTS dimension can include values representing all possible products of a company.

A set of data items is "dimensional" if each data item in the set is associated with a value from a particular dimension. For example, assume that each row of a table includes data about a particular event, including the date of the event. In this example, the "event data" is "dimensional" relative to the TIMES dimension.

A set of data items is "multi-dimensional" if the data items are dimensional relative to more than one dimension. For example, assume that each row of a SALES table includes data for a particular sale, including (1) the date of the sale, (2) the product sold, and (3) the region in which the sale was made. In this example, the "sales data" is multidimensional, since the sales data is dimensional relative to the TIMES, PRODUCTS and REGION dimensions.

A table that stores multi-dimensional data is often referred to as a "fact table". Tables that store the dimension values of a particular dimension are referred to as "dimension tables". Thus, the same database that would have the SALES table described above would typically also include a TIMES table, a PRODUCTS table, and a REGION table.

Each row of a fact table will correspond to a dimensional value combination that includes one value for each of the dimensions. For example, in the SALES table described above, each row will typically correspond to a combination of TIMES, PRODUCTS and REGION dimension values. The set of dimension values associated with a given SALES table row may be represented as (t, p, r), where t is the value for the TIMES dimension, p is the value for the PRODUCTS dimension, and r is the value for the REGION dimension.

Typically, not all dimension value combinations will have a corresponding row in the fact table. Thus, the set of dimension value combinations that are associated with rows in the fact table is a subset of the cross-product of the dimension values from each of the dimensions.

A fact table is referred to as "dense" along a dimension 'D' if the fact table contains all possible values of 'D' for any given combination of the other dimensional values in the fact table. For example, assume that the REGION dimension has only three possible values RGN1, RGN2 and RGN3. The SALES table is dense relative to the REGION dimension if, for every combination (t, p) reflected in the SALES table, the SALES table includes rows for the dimension value combinations (t, p, RGN1), (t, p, RGN2) and (t, p, RGN3).

"Densification" is the process of making a set of data denser than it originally was along a dimension of interest. A set of rows may be densified, for example, by creating dummy rows for missing combinations of dimensional values. Data whose density has been increased will be referred to as having been "densified," and the dimension with respect to which it has been or is being increased will be referred to as the "densifying" dimension.

Densification is useful for a variety of situations. For example, queries in some multidimensional database systems (e.g., On-Line Analytical Processing (OLAP)) require data to be densified along the time dimension. Also, some users, such as OLAP users, are accustomed to seeing the data in a densified format, especially when window functions are computed and presented. For example, if there are no sales for a particular day, some users still want to see a display showing the running total of sales, the day, and a blank space in the sales column (because the running total is a window function in OLAP, which usually displays densified data).

Using Structured Query Language (SQL), densification may be performed by a series of operations that include the DISTINCT, CROSS JOIN and OUTER JOIN operations. As an example, consider a database schema that includes the following tables:

SALES (time_id, prod_id, amount_sold)
TIMES (time_id, calendar_month_desc, calendar_quarter_desc, Calendar_year)
PRODUCTS (prod_id, prod_subcategory, prod_category)

In the above set of tables, the SALES fact table stores a measure (amount sold) that is dimensional relative to the TIMES and PRODUCTS dimensions. For each row in the SALES table, the "time_id," column stores the time dimension value for the row, and the "product_id," column stores the PRODUCTS dimension value for the row. Thus, for a given combination of a product value and a time value included in the SALES fact table, the amount_sold column stores the measure value "amount sold".

The TIMES dimension table stores all time_id values, and details about the time that corresponds to each time_id value. Similarly, the PRODUCTS dimension table stores all product_id values, and details about the product that correspond to each product_id value.

Suppose, the data in SALES is sparse along the TIMES dimension. A query, Q1, that will densify the SALES data along the TIMES dimension is Q1:

```
SELECT V2.prod_id, V2.time_id, V1.amount_sold
FROM SALES V1 RIGHT OUTER JOIN
(
    (SELECT DISTINCT prod_id
        FROM SALES) CROSS JOIN
    (SELECT time_id
        FROM TIMES)
) V2
ON (V1.prod_id = V2.prod_id AND V1.time_id = V2.time_id);
```

In Q1, V2 includes all combinations of (1) prod_id values that are actually in the SALES table, and (2) all time_id values in the TIMES table. In particular, the "SELECT DISTINCT prod_id FROM SALES" clause finds all of the unique values of prod_id found in the SALES table.

Similarly, the "SELECT time_id FROM TIMES" clause finds all values of time_id in the TIMES table. The "CROSS JOIN" construct causes a cross product to be taken between the unique prod_ids found and all time_ids.

The RIGHT OUTER JOIN operation between V1 (the SALES table) and V2 produces a result set that includes (1) all of the rows in the SALES table, and (2) empty rows that correspond to the time_id and prod_id combinations, from V2, which are not found in the SALES table.

FIG. 1 is a flowchart showing method 100 for performing the densification, which is used in Q1. In step 102, a sort is performed to obtain all DISTINCT values of prod_id in the SALES table. In step 104, a CROSS JOIN of all prod_id values with time_id values in the TIMES table is performed, thereby obtaining a set of (prod_id, time_id) dimension value combinations that is dense in the Time dimension, but includes only those values of prod_id found in the SALES table. In step 106, an OUTER JOIN of the SALES fact table with the results of the CROSS JOIN of step 104 is performed, thereby adding blank rows to the SALES table for any (prod_id, time_id) dimension value combination of the CROSS JOIN not found in the original SALES table.

As another example using the same fact table and dimension tables, suppose the user is interested in a running value of year-to-date (YTD) sales for each product on each day. Assuming that the data is sparse, a query, Q2, expressed in SQL that produces the YTD sales data is

Q2:

```
SELECT V2.prod_id, V2.time_id, SUM(sales) OVER
    (PARTITION BY V2.prod_id, V2.year ORDER BY
    V2.time_id) YTD_sales
FROM SALES V1 RIGHT OUTER JOIN
    (
        (SELECT DISTINCT prod_id
            FROM SALES) CROSS JOIN
        (SELECT time_id, calendar_year year
            FROM TIMES)
    ) V2
    ON (V1.prod_id = V2.prod_id AND V1.time_id = V2.time_id);
```

In Q2, the "FROM SALES . . . " statement is identical to Q1, and causes the same sequence of operations to occur. The "SELECT V2.prod_id . . . " statement, sums the sales values. The sum is returned in the YTD_sales variable. The data returned is partitioned according to product and year by the standard SQL PARTITION BY construct, and then ordered by time_id using the ORDER BY construct.

Similar to the example of Q1, calculating the year-to-date sales requires: a sort to get all DISTINCT values of prod_id in SALES table, (2) a cross join of all prod_id values with time_id values in the TIMES table, (3) an OUTER JOIN of the SALES table with the result of the CROSS JOIN in (2). Additionally, this query performs (4) a sort of the OUTER JOIN results in (3) on columns (prod_id, year, time_id) to compute the window function associated with the YTD.

The present inventors have recognized that the sort of step 102 (or step (1)) is an extra computation that is not needed for the final result, but cannot be avoided in the prior art. Additionally, the present inventors have recognized that Q1 is not intuitive. Especially with more complicated densification queries, it can be very difficult to decipher the intent of the user by inspecting the statement, because of the unintuitive nature of the series of operations used to perform the densification. Thus, the structure of the current way of performing densification within query is complex, hard to understand, and inefficient to compute.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a flowchart showing method 100 for performing densification.

FIG. 2A is a block diagram of the syntax of a partitioned table.

FIG. 2B is a block diagram of the syntax of the outer join type of FIG. 2C.

DETAILED DESCRIPTION OF THE INVENTION

Figure 2C:
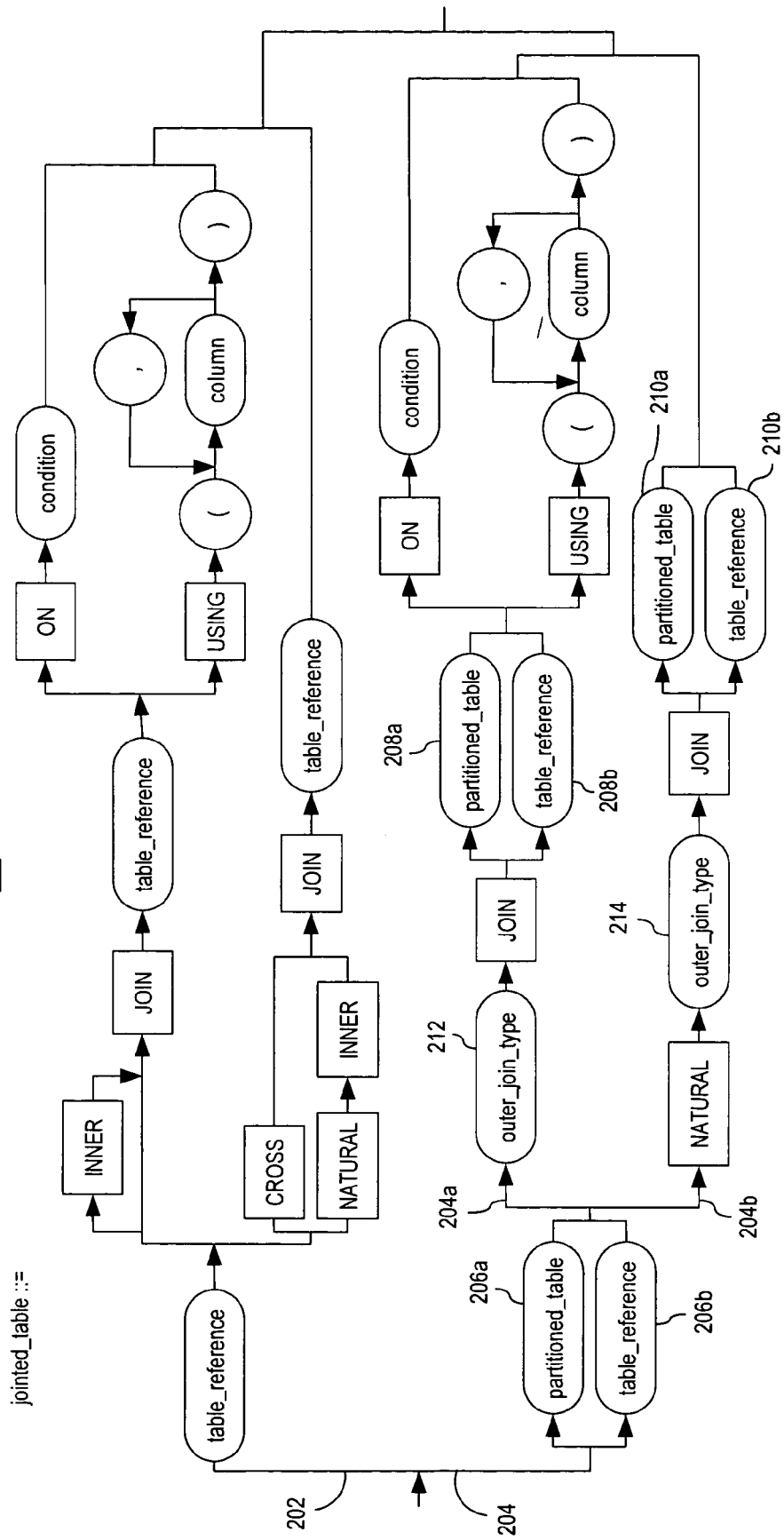
FIG. 2C is a block diagram of an extended JOIN syntax using the partitioned table of FIG. 2A, according to an embodiment of the invention.

A method and apparatus for providing DML Statements for densifying data are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present methods and apparatuses provide several features that can each be used independently of one another or with any combination of the other features. Although many of the features of the present apparatuses and methods of providing DML Statements for densifying data are motivated by the problems explained above, any individual feature may not address any of the problems discussed above or may only address one of the problems discussed above. Some of the problems discussed above may not be fully addressed by any of the features of the present method of storing and organizing data related to fact tables. Although headings are provided, information related to a particular heading, but not found in the section having that heading, may also be found elsewhere in the specification.

Functional Overview

Techniques are described herein for densifying data without having to perform the combination of DISTINCT, CROSS JOIN, and OUTER JOIN operations. For example, an embodiment of the invention densifies data without performing a DISTINCT operation. In particular, data is densified without performing a sort operation to find the distinct values of a dimension in which the data is not being densified.

According to one embodiment of the invention, the database language supported by a database server is extended to support a construct that may be used in DML statements that at least in combination with other constructs causes a densification operation. For example, a new construct for DML statements is provided for partitioning a set of data that is to be used on an operation associated with another construct to densify the data. Specifically, in an embodiment, the syntax and semantics of the OUTER JOIN statement is extended to include a partitioning construct. The OUTER JOIN with the partitioning construct will be referred to as a PARTITIONED OUTER JOIN. The PARTITIONED OUTER JOIN returns data that is partitioned with respect to a specified dimension, and each partition is OUTER JOINED to another set of values.

If the partitions are OUTER JOINED to a dense set of dimension values, a dense table may be formed. Similarly, if the partitions are OUTER JOINED to a set of values that is a denser set of dimension values than a corresponding set of dimension values in the original table, the resultant table may be denser than the original set. In the example embodiments described below, the construct for partitioning data is used to operate on data involved in an OUTER JOIN in order to densify data relative to a dimension. Although in these examples the partitioning construct performs the densification as part of an OUTER JOIN, the specification is not limited to embodiments in which the densification is performed via a partitioning construct or an OUTER JOIN. The construct for partitioning data in DML statements, outside of the window and spreadsheet functions, and the construct for the densification of data are independent contributions to the art. A different construct for densifying data may be used that does not necessarily involve an OUTER JOIN statement.

The original set of data being densified may be a table, which may be referred to as a target table. The target table may be a fact table or any other type of table. For example, the target table may be a virtual table formed by a database expression.

Partitioned_Table References

Database servers are designed to execute database statements that conform to the database language that they support. SQL is a database language supported by many database servers. Database languages typically include (1) constructs for identifying operations, and (2) constructs for identifying the data upon which the operations are to be performed. Since many database operations are designed to be performed on tables, the database statements typically include table identifiers that specify the tables upon which the operations are to be performed. When describing the syntax of the database language, such table identifiers are represented by the label table_reference.

FIG. 2A is a block diagram of the syntax of a partitioned table 220. Partitioned table 210 includes table reference 221, comma 224, and expr 210, which will be referenced in the discussion below.

According to one embodiment, the query execution engine of a database server is extended to support database statements that have partitioned_table references (partition table 220) in one or more contexts in which the language previously only supported table_references. According to one embodiment, the metasyntax of a partition_table reference, is illustrated in FIG. 2A, and is defined, in Backus-Naur Form (BNF), as follows:

partitioned_table:=table_reference PARTITION BY (expr [, expr] . . . )

Referring to FIG. 2A, in the syntax of partition table 220, table reference 221 is placed to the left of key words "PARTITION BY". Table reference 221 may be any table. Similarly, to the right of the "PARTITION BY" key words is expr 222, which may be reference to a column or an expressions that evaluated to a column, such as Col1+Col2, where Col1 and Col2 are references to columns. Following the "PARTITION BY" keywords, there may be one expr 222, or there may be any number of expressions, such as expr 222, where each expression separated from adjacent expressions by commas, such as comma 224. For example, for a SALES table having dimensions corresponding to region of sale (regn_id), the time of the sale (time_id), the warehouse supplying the product sold (warehouse_id), and the company delivering the product sold (deliv_id). Perhaps the product of the warehouse_id and deliv_id can be used to uniquely identify all products, and the database uses prod_id=warehouse_id*deliv_id to identify a product. Partitioned table 220 may be SALES PARTITION BY (warehouse_id*deliv_id, time_id). Partitioned_table references, such as partition table 220, may be used in a variety of contexts that previously required table references. In an embodiment, the syntax of the PARTITIONED OUTER JOIN is similar to that of a standard OUTER JOIN, except wherever a table_reference is called for in the standard OUTER JOIN, the PARTITIONED OUTER JOIN accepts either a partitioned_table or a table_reference.

The "Partition by" Clause

As illustrated in FIG. 2A, a partitioned_table reference includes a table_reference and a PARTITION BY clause. The table specified by the table_reference that precedes a PARTITION BY clause shall be referred to herein as the "target table" of the PARTITION BY clause. The target table may be a fact table or any other type of table. The expressions and columns in the PARTITION BY clause will be referred to as partitioning expressions and columns, respectively.

During the execution of a statement that includes the PARTITION BY clause, the database server splits the target table specified by table reference 221 into partitions, where each partition corresponds to a dimension value of the column resulting from expr 222. For example, if the target table is the SALES fact table, and expr is the column corresponding to the PRODUCT dimension, then the SALES table is partitioned by prod_id. If there are three prod_ids, P1, P2, and P3, then the first partition of partitioned product table will be those rows having prod_id P1, the second partition will be those rows having prod_id P2, and the third partition will be those rows having prod_id P3. Similarly, using comma 224, if there is a region dimension having two region IDs (regn_id), R1 and R2, for each prod_id value, then the partitioned table clause "SALES PARTITION BY {prod_id, regn_id}" will partition the table into six partitions. The first partition has product ID P1 and region ID R1, the second partition has product ID P1 and region ID R2, the third partition has product ID P2 and region ID R1, the fourth partition has product ID P2 and region ID R2, the fifth partition has product ID P3 and region ID R1, and the sixth partition has product ID P3 and region ID R2.

Thus, the hierarchy of the partitions in the above embodiment is: the first partitioning index listed divides the target table into major partitions, and the next partitioning index divides each major partition into smaller partitions. However, in other embodiments, any other partitioning hierarchy may be used. For example, the last partitioning dimension listed may be used to make the major partitions and the next partitioning dimension listed may be used to partition the major partitions into smaller partitions. In this embodiment, the partitioned table clause "SALES PARTITION BY {prod_id, regn_id}" results in the first partition having product ID P1 and region ID R1, the second partition having product ID P2 and region ID R1, the third partition having product ID P3 and region ID R1, the fourth partition has product ID P1 and region ID R2, the fifth partition having product ID P2 and region ID R2, and the sixth partition having product ID P3 and region ID R2.

Outer Join Types

FIG. 2B is a block diagram of the syntax of the outer join type 230 of FIG. 2C. Outer join type 230 includes options 242.

In an embodiment, the syntax of an OUTER JOIN allows either a partitioned table or table reference to occur on either side of an OUTER JOIN. Accordingly, as indicated by options 242 of FIG. 2B, the outer join type may be a FULL, a LEFT, or a RIGHT OUTER JOIN depending on whether the resulting table will contain all rows from both tables specified on both sides, the table specified on the left side, or the table specified on the right side of the keywords "OUTER JOIN" in the OUTER JOIN clause.

Specifically, in a LEFT OUTER JOIN all rows in the table on the left of the "OUTER JOIN" keywords are included in the resulting table, and the target table appears on the right of the "OUTER JOIN" keywords. If a partitioned table appears on the right, each partition is separately OUTER JOINED to the table_reference or patitioned_table on the left so that the table_reference or partitioned_table on the left of the "OUTER JOIN" keywords may be used to densify the target partitioned_table on the right of the "OUTER JOIN" keywords. Similarly, in a RIGHT OUTER JOIN all rows in the table on the right of the "OUTER JOIN" keywords are included in the resulting table, and the target table appears on the left of the "OUTER JOIN" keywords. If a partitioned_table appears on the left, each partition is separately OUTER JOINED to the table_reference or partitioned_table on the right of the "OUTER JOIN" keywords so the table_reference or partitioned_table on the right of the "OUTER JOIN" may be used to densify the target partitioned table on the left of the "OUTER JOIN" keywords. In a FULL OUTER JOIN, the resulting table includes all rows from both tables, the table that appears on the right and the table that appears of the left of the "OUTER JOIN" keywords. If a partitioned_table appears on either side, each partition is separately OUTER JOINED to the table_reference or partitioned_table on the other side of the "OUTER JOIN" keywords.

For example, consider two tables A and B in which table A has rows for (P1, S1), (P3, S2), (P3, S3), (P5,-), and (P10, -), and table B has rows for S1, S2, S3, and S4, and consider OUTER JOINing these tables subject to the condition A.s_id=B.s_id, projecting the OUTER JOIN results on columns A.s_id and B.p_id (where s_id refers to the dimension having values S1, S2, S3, and S4, and p_id refers to the dimension having values P1, P3, P5, and P10). If neither table is a partitioned table, if table A is to the left of the keyword "OUTER JOIN" and table B is to the right of the keywords "OUTER JOIN", then the results of a LEFT OUTER JOIN is a table having rows for (P1, S1), (P3, S2), (P3, S3), (P5,-), and (P10, -). Similarly, the results of a RIGHT OUTER JOIN is a table having rows for (P1, S1), (P3, S2), (P3, S3), and (-, S4). Also, the results of a FULL OUTER JOIN is a table having rows for (P1, S1), (P3, S2), (P3, S3), (P5,-), (P10, -), and (-, S4). If table A is partitioned on p_id, then the results of a LEFT OUTER JOIN is a table having rows for (P1, S1), (P3, S2), (P3, S3), (P5,-), and (P10, -). The results of a LEFT OUTER JOIN are the same as if table A was not partitioned. Since Table B was not partitioned, no densification of Table B occurs. The results of a RIGHT OUTER JOIN is a table having rows for (P1, S1), (P1, S2), (P1, S3), (P1, S4), (P3, S1), (P3, S2), (P3, S3), (P3, S4), (P5, S1), (P5, S2), (P5, S3), (P5, S4), (P10, S1), (P10, S2), (P10, S3), and (P10, S4). In the RIGHT OUTER JOIN, each of the P1, P3, P5, and P10 partitions is densified to include one row for each of value of the second column (S1, S2, S3, and S4). The results of a FULL OUTER JOIN is a table having rows for (P1, S1), (P1, S2), (P1, S3), (P1, S4), (P3, S1), (P3, S2), (P3, S3), (P3, S4), (P5, S1), (P5, S2), (P5, S3), (P5, S4), (P5,-), (P10, S1), (P10, S2), (P10, S3), (P10, S4), and (P10, -). In addition to the rows included in the RIGHT OUTER JOIN, the results of a FULL OUTER JOIN include rows (P5,-) and (P 10,-), which are not included in the RIGHT OUTER JOIN. In addition to densifying the dimension of the second column of the table A to include each value the column containing the same dimension in Table B, rows (P5, -) and (P10,-) are added since they would be added in the cross product performed in a LEFT OUTER JOIN.

EXAMPLES

To clarify the above, first the columns that are placed in the result record regular ANSI compliant JOIN forms will be discussed, and then the columns that are placed in the result record of PARTITIONED OUTER JOIN forms will be discussed. In an ANSI compliant form, assume there are two tables T1(c1, c2, c3) and T2(c1, c4), where c1, c2, c3, and c4 represent columns. When using named column JOINs (such as a JOIN having a USING clause or a natural JOIN), the result record is composed of (1) the columns used as the join keys, (2) the columns of the non-join keys from the left of the JOIN operand, and (3) the columns of the non-join keys from the right of the JOIN operand. For example, the result of the clause T1 RIGHT OUTER JOIN T2 USING (c1), or the clause

T1 NATURAL RIGHT OUTER JOIN T2 is composed of columns (c1, T1.C2, T1.C3, T2.c4). Although column c1 appears in both tables T1 and T2, since column c1 was used as the join key only one copy of column c1 is placed in the results.

In contrast, for ANSI compliant joins in which the join condition is specified through the ON clause, the result is composed of (1) columns from T1, and (2) columns from T2, and the columns of the join key will appear twice once with the columns from T1 and once with the columns from T2. For example, the results of a clause, T1 RIGHT OUTER JOIN T2 ON T1.c1=T2.c1, is a table in which the rows have the columns (T1.c1, T1.c2, T1.c3, T2.c1, T2.c2). However, the SELECT clause may be used to project out the columns of interest. For example, assume that tables T1 is

| C1 | C2 | C3 |
|----|----|----|
| T1 | | |
| A1 | B1 | C1 |
| A1 | B2 | C3 |
| A2 | B3 | C1 |
| A3 | B3 | C2 |

Also, assume that table T2 is

| C1 | C4 |
|----|----|
| T2 | |
| A1 | D1 |
| A2 | D2 |
| A3 | D3 |

As an example of a named column join, the statement
SELECT *
FROM T1 NATURAL RIGHT OUTER JOIN T2;

returns the following.

| C1 | C2 | C3 | C4 |
|----|----|----|----|
| A1 | B1 | C1 | D1 |
| A1 | B2 | C3 | D1 |
| A2 | B3 | C1 | D2 |
| A3 | B3 | C2 | D3 |

In the above results, all columns from the two tables T1 and T2 appear except that the C1 and C4 columns only appear once even though there are two C1 columns and two C2 columns (one in each table), because the C1 and C4 columns are the join key. When using the SELECT clause to project out columns, the statement
SELECT C1, T1.C3, T2.C4
FROM T1 NATURAL RIGHT OUTER JOIN T2;

results in the following table

| c1 | C3 | C4 |
|----|----|----|
| A1 | C1 | D1 |
| A1 | C3 | D1 |
| A2 | C1 | D2 |
| A3 | C2 | D3 |

Since the select clause only specified columns C1, T1.C3, T2.C4, column C2 does not appear in the results.

As an example of using the ON clause, consider the statement
SELECT *
FROM T1 RIGHT OUTER JOIN T2 ON T1.C1=T2.C1;

The results returned by the above statement are

| C1 | C2 | C3 | C1 | C4 |
|----|----|----|----|----|
| A1 | B1 | C1 | A1 | D1 |
| A1 | B2 | C3 | A1 | D1 |
| A2 | B3 | C1 | A2 | D2 |
| A3 | B3 | C2 | A3 | D3 |

In the above table, in contrast to the NATURAL JOIN or the USING clause, the column c1 appears twice, because the column c1 from table T1 appears and the column c1 from table T2 appears.

As an example of projecting out columns using a SELECT clause in a statement having an ON clause, consider that statement
SELECT T2.C1, T1.C2, T1.C3, T2.C4
FROM T1 RIGHT OUTER JOIN T2 ON T1.C1=T2.C1;

The above statement results in the table

| C1 | C2 | C3 | C4 |
|----|----|----|----|
| A1 | B1 | C1 | D1 |
| A1 | B2 | C3 | D1 |
| A2 | B3 | C1 | D2 |
| A3 | B3 | C2 | D3 |

Although ordinarily, the C1 column from both the T1 table and the T2 table would be returned when using the ON clause, since the select clause specifies T2.C1, T1.C2, T1.C3, T2.C4 and column T1.C1 is not specified, therefore the C1 column from the T1 table does not appear in the results.

Returning to the PARTITIONED OUTER JOIN, in contrast to a standard ANSI compliant JOIN, the results of a named column partitioned outer join include (1) the result of the partitioning expression from the left operand, if any, (2) the result of the partitioning expressions from right operand if any, (3) the join columns, (4) the non-partitioning and non-join columns from left operand, and (5) the non-partitioning and non-join columns from right operand. For example, consider the clause
T1 PARTITION BY (C2) NATURAL RIGHT OUTER JOIN T2

The result recodes of the above statement is composed of columns (T1.c2, c1, T1.c3, T2.c4) Similarly, the results from a partitioned outer join having the join condition specified through an ON clause includes (1) the partitioning expressions from the left operand if any, (2) the partitioning expressions from right operand, if any, (3) the non-partitioning columns from left operand, and (4) the non-partitioning columns from right operand. For example, consider the clause
T1 PARTITION BY (C2) RIGHT OUTER JOIN T2 ON T1.C1=T2.C1

The results of this clause includes the columns (T1.c2, T1.c1, T1.c3, T2.c1, T2.c4).

As a first example of projecting out columns of interest in the SELECT clause consider the statement

SELECT *
FROM T1 PARTITION BY (C2) NATURAL RIGHT OUTER JOIN T2;

The result of this statement is

| C2 | C1 | C3 | C4 |
|----|----|----|----|
| B1 | A1 | C1 | D1 |
| B1 | A2 |    | D2 |
| B1 | A3 |    | D3 |
| B2 | A1 | C3 | D1 |
| B2 | A2 |    | D2 |
| B2 | A3 |    | D3 |
| B3 | A1 |    | D1 |
| B3 | A2 | C1 | D2 |
| B3 | A3 | C2 | D3 |

In the above results, table T1 was partitioned by column C2. Then each partition of table T1 was outer joined to table T2 using column C1 as the join key. Since a named join was used, the join column, C1, appears only once in the results.

Now consider the statement
SELECT *
FROM T1 PARTITION BY (C2) RIGHT OUTER JOIN T2 ON T1.C1=T2.C1;

The resulting table is

| C2 | C1 (of T1) | C3 | C1 (of T2) | C4 |
|----|------------|----|------------|----|
| B1 | A1         | C1 | A1         | D1 |
| B1 |            |    | A2         | D2 |
| B1 |            |    | A3         | D3 |
| B2 | A1         | C3 | A1         | D1 |
| B2 |            |    | A2         | D2 |
| B2 |            |    | A3         | D3 |
| B3 |            |    | A1         | D1 |
| B3 | A2         | C1 | A2         | D2 |
| B3 | A3         | C2 | A3         | D3 |

Since the join condition is specified in the ON clause two C1 columns appear in the above table. One of the C1 columns is derived from table T1, and the other is derived from table C2.

As an example of using the SELECT clause to project out columns of interest, consider the statement
SELECT T1.C2, T1.C3, T2.C1
FROM T1 PARTITION BY (C2) RIGHT OUTER JOIN T2 ON T1.C1=T2.C1;

The resulting table is

| C2 | C3 | C1 |
|----|----|----|
| B1 | C1 | A1 |
| B1 |    | A2 |
| B1 |    | A3 |
| B2 | C3 | A1 |
| B2 |    | A2 |
| B2 |    | A3 |
| B3 |    | A1 |
| B3 | C1 | A2 |
| B3 | C2 | A3 |

Since columns C1 of table T1 and C4 of table T2 were not specified, they do not appear in the resulting table.

As another example, suppose table T1 has two rows:
{(A1, B1, C1),
(A1, B1, C2)}

Suppose also that table T2 has 3 rows:
{(B1),
(B2),
(B3)}

Consider the statement
SELECT *
FROM T1 PARTITION BY (A) RIGHT OUTER JOIN T2 ON T1.B=T2.B;

The results of the above statements is the table

| A  | B (of T1.B) | C  | B (of T2.B) |
|----|-------------|----|-------------|
| A1 | B1          | C1 | B1          |
| A1 | B1          | C2 | B1          |
| A1 |             |    | B2          |
| A1 |             |    | B3          |

Similarly, consider the statement
SELECT T1.A, T1.C, T2.B
FROM T1 PARTITION BY (A) RIGHT OUTER JOIN T2 ON T1.B=T2.B;

The above statement projects on the columns T1.a, T1.c and T2.b, and results in the table

| A  | C  | B  |
|----|----|----|
| A1 | C1 | B1 |
| A1 | C2 | B1 |
| A1 |    | B2 |
| A1 |    | B3 |

Partitioned Outer Join

FIG. 2C is a block diagram of an extended JOIN syntax having branches 202 and 204. Branch 204 includes partitioned table 206, partitioned table 208, partitioned table 210, outer join type 212, outer join type 214, and condition 216, which are referenced in the discussion below.

Branch 202 gives the syntax for the INNER and CROSS JOINs. Regarding branch 204, the corresponding syntax of the PARTITIONED OUTER JOIN in BNF format is as follows.

```
join_table := {partitioned_table | table_reference}
    {FULL | LEFT | RIGHT}
       [OUTER] JOIN
       {partitioned_table | table_reference}
       {ON <join_cond> | USING (col[, col] ... )}
    |
    {partitioned_table | table_reference}
    NATURAL {FULL | LEFT | RIGHT}
       [OUTER] JOIN
       {partitioned_table | table_reference}
```

Thus, in branch 204, starting from the left, the user first specifies either partitioned table 206a or table reference 206b, then the user may specify the keyword "NATURAL"

on branch 204b, or the user may use branch 204a and not use the keyword "NATURAL." Next follows a keyword specifying an outer join type 212 on branch 206a or outer join type 214 on branch 206b. Outer join type 230 is an embodiment of outer join types 212 and 214. Following outer join type 212 or outer join type 214 comes the keyword JOIN. On branch 204a either partitioned table 208a or table reference 208b follow the JOIN keyword. On branch 204b either partitioned table 210a or table reference 210b follows the JOIN keyword. Since in a NATURAL OUTER JOIN no conditions are applied, on branch 204b, the OUTER JOIN clause ends with either the partitioned table 210a or table reference 210b. Following partitioned table 208a or table reference 208b is either keyword "ON" for specifying a join condition or "USING" for specifying a join key. Similar to existing ANSI join operators, the PARTITIONED OUTER JOIN allows complex join conditions in which the join condition 216 (i.e., join_cond, following the "ON" keyword) may be an arbitrarily complex Boolean expression. The join_cond or join condition 216 can apply to columns of tables from either side of the join, including any column in the partitioning expressions of a partitioned table.

Following the "USING" keyword, as indicated by comma 224, there may be any number of expressions expr 222 placing conditions on the join operation. Each expr 222 either is a column or an expression that evaluates to a column. The result of the join is a UNION of the results from applying an OUTER JOIN to each of the partitions. In an embodiment, after the OUTER JOIN is performed, the partitioning expression takes a value that identifies the corresponding partitioned table. If reference table 206b is used instead of partitioned table 206a, and either reference table 208b is used instead of partitioned table 208a or reference table 210b is used instead of partitioned table 210a, then the PARTITIONED OUTER JOIN reverts to a standard OUTER JOIN.

Some examples of legal PARTITIONED OUTER JOINS using branch 204a are:

SALES V1 PARTITION BY (prod_id) RIGHT OUTER JOIN TIMES V2 ON (V1.time_id=V2.time_id)

TIMES V2 LEFT OUTER JOIN SALES V1 PARTITION BY (prod_id) ON (V1.time_id=V2.time_id)

SALES V1 PARTITION BY (prod_id) RIGHT OUTER JOIN TIMES V2 USING (time_id)

Each of the above examples performs the same densification of the SALES table. The first example uses a right outer join, while the second example uses a left OUTER JOIN. Accordingly, the positions of the SALES fact table and the TIME dimension table are reversed in relation to the "OUTER JOIN" keywords so that the result is the same. In the third example, rather than representing an equijoin condition in the forms of an equation, the join key is specified by name, which is equivalent to the equijoin condition of the first two examples. An example of the syntax of the OUTER JOIN expression using branch 204b is SALES V1 PARTITION BY (prod_id) NATURAL RIGHT OUTER JOIN TIMES V2

In this example, the common columns of the TIMES and SALES tables are used as a join keys. If the TIMES and SALES table have only one common column (time_id), for example, the results will be the same as the statements in the three statements above.

USING THE "PARTITION BY" OPERATOR IN A DENSIFICATION OPERATION

Using the PARTITIONED OUTER JOIN syntax, the query Q1 can be rewritten as

Q1_new:

```
SELECT V1.prod_id, V2.time_id, V1.amount_sold
FROM SALES V1 PARTITION BY (prod_id)
RIGHT OUTER JOIN TIMES V2
    ON (V1.time_id = V2.time_id);
```

The Q1_new query just requires a single PARTITIONED OUTER JOIN, thereby simplifying the coding required to perform the densification as compared to the code of Q1 (in the background section) that previously would have been required to perform the densification.

Similarly, using the PARTITIONED OUTER JOIN syntax, the query Q2 can be rewritten as:

Q2_new:

```
SELECT V1.prod_id, V2.time_id, SUM(sales) OVER
    (PARTITION BY V1.prod_id, V2.year
    ORDER BY V2.time_id) YTD_sales
FROM SALES V1 PARTITION BY (prod_id) RIGHT OUTER JOIN
    (SELECT time_id, calendar_year year
    FROM TIMES) V2
ON (V1.time_id = V2.time_id);
```

The Q2_new query requires: (1) a PARTITIONED OUTER JOIN of SALES with TIMES and (2) a sort of the results of the PARTITIONED OUTER JOIN in "(1)" to compute the YTD window function.

Methods of Implementing a Partitioned Outer Join

In response to receiving a statement that specifies a partitioned outer join, the database server executes one or more routines to perform the partitioned outer join operation. A variety of techniques may be used by the database server to perform the partitioned outer join. According to one embodiment, a database server includes routines for each of a plurality of the techniques, and then chooses which technique is most appropriate for each statement that contains a partitioned outer join operation. In an embodiment, the method chosen for a given query depends upon which method will be more efficient for the performing the query.

While the invention is not limited to any particular technique, three techniques for performing a partitioned outer join shall be described hereafter. In each of the three methods presented, a series of "mini-joins" (i.e., joins that are not performed on the entire table at once) is performed. Each of the three methods may be used separately from one another without performing an estimate regarding computing costs to decide if another of the three methods is more efficient. Alternatively, any two the above methods may be used in combination with one another in which the cost computation is performed to decide which of the two methods to use for a give query.

Nested Loops

Figure 3:
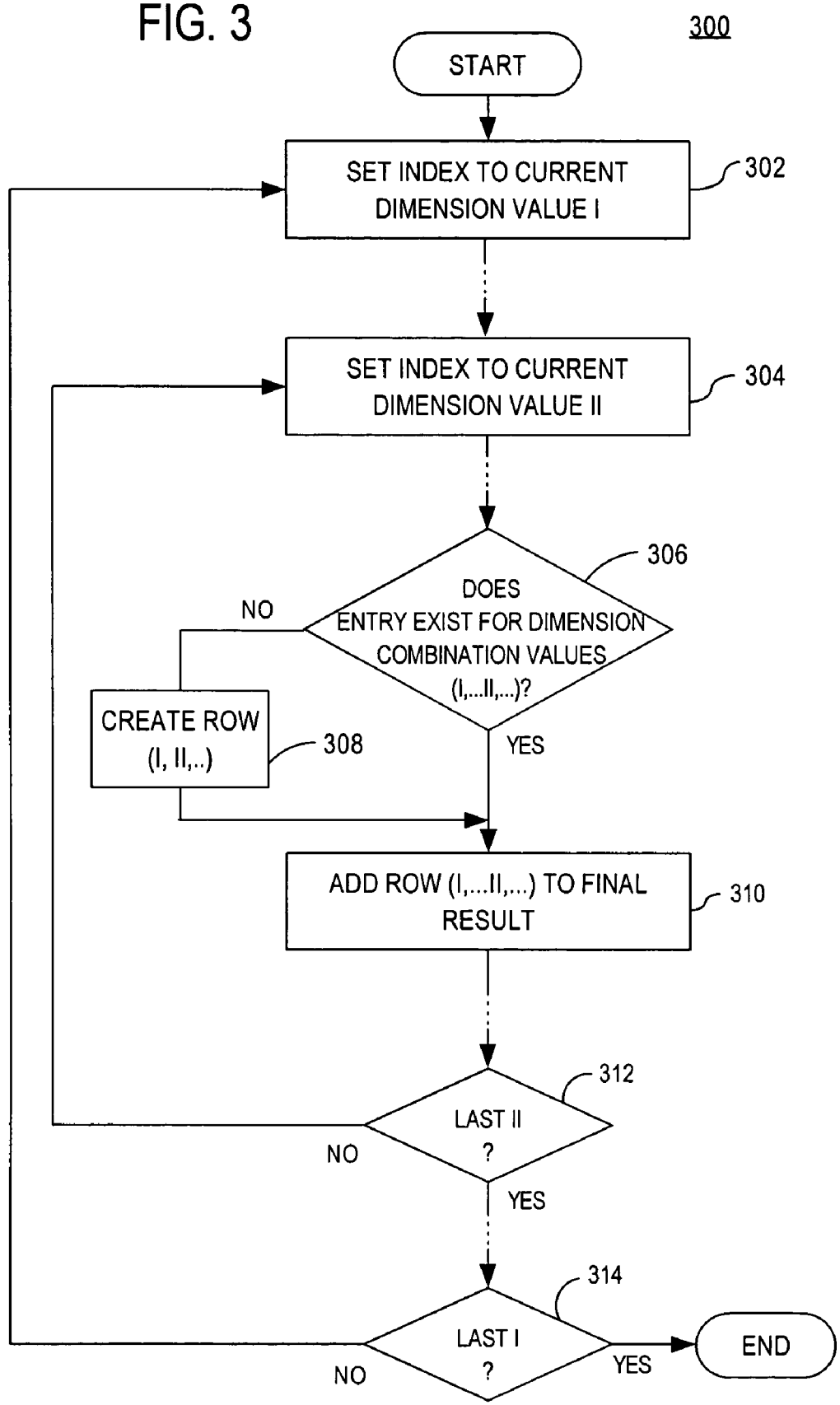
FIG. 3 is a flowchart showing an example of a method for implementing the PARTITIONED OUTER JOIN of FIG. 2C.

FIG. 3 is a flowchart showing method 300, which will be referred to a Nested Loop Partitioned Outer Join.

The nested loop (e.g., do-loops) is a code including at least two loops in a nested relationship. For example, the outermost loop iterates across one set of values, and a nested loop iterates across a second set of values for each value in the first set of values. For performing densification, the one or more of the outermost loops of the nested loop may correspond to the partitioning dimensions. Each of the innermost loops may correspond to a different densifying dimension. Each loop has an index. During each iteration of a loop, the loop index is set to the next value.

The loops corresponding to the partitioning dimensions will be referred to as the partitioning loops, and the corresponding loop indexes will be referred to as the partitioning indexes. The loops corresponding to the densifying dimensions will be referred to as the densifying loops and the corresponding loop indexes will be referred to as the densifying indexes. The index of a loop that corresponds to a particular dimension will be assigned a new value from that dimension during each iteration of the loop. Thus, the index values of a partitioning loop correspond to the distinct dimension values of the partitioning dimension. For example, if the table has three rows, and each of the three rows has the same dimension value for the partitioning dimension, then the partitioning loop executes only once for that particular dimension value. The index values of the densifying loops correspond to the dimension values of the densifying dimensions. Thus, during each iteration of a densifying loop, the index value of the loop corresponds to a unique dimension value. As each of the loops cycles through its dimension values, an "if" statement checks if an entry (e.g., a row) exists in the data (e.g., a target table) having the dimension value combination corresponding to the current index value combination of the loops. If the entry exists, it is added to a set of output data. If the entry does not exist for the dimension value, a null valued entry is created having the dimension value combination corresponding to the index value combination.

For example, the following algorithm may be used for the underlying code of the Q1_new query, in which the PRODUCT dimension is used for the partitioning dimension and the TIME dimension is used for the densifying dimension.

```
for each prod_id from (I)
{
  for each time_id from (II)
  {
    probe index I using (prod_id, time_id)
    return the matching rows
    if there is no matching row, create a dummy row
  }
}
``` where the index I uses distinct values of the Product dimension of the SALES table, and the index II performs a full scan of the Times dimension of the TIMES table or uses an index for the Times dimension that was already setup.

The nested loop join uses an available index as its loop index and may be used with a nonequijoin. If an index does not exist for use as the loop index, it is possible to set up indexes for the purpose of being able to perform a nested loop outer join or sort merge outer join. However, then the computing costs associated with setting up the indexes, may make the partitioned nested loop less efficient than the other methods of performing a partitioned outer join.

Referring to FIG. 3, in step 302, the index (index I) of the partitioning loop is initially set to the first distinct value of the Product dimension. In subsequent cycles of the loop, index I is set to a current value, which may be the next distinct dimension value of the Product dimension. A method of obtaining the values of the partitioning dimension for index I is discussed below. In an embodiment, if an index exists for any of the dimensions other than the densifying dimension in which the index consists of distinct values of the dimension, it may be used for index I, the partitioning index.

In step 304, the index of the next loop, index II, is set to a current value, which may be the next distinct dimension value of the index with respect to which the fact table is being densified. There may be any number of partitioning and/or densifying loops, each corresponding to different partitioning dimension and/or densifying dimension, respectively. If the loop used for partitioning the data corresponds to a dimension with respect to which the data is fully dense, then the corresponding loop will have an index value corresponding to each of the dimension values.

In step 306, a determination is made (e.g., via an "if" statement) whether there is a row having the dimension value combination corresponding to the combination of current index values. Alternatively, for a non-equijoin, a determination is made whether the dimension combination of the present row and the index value combination satisfy the join conditions (e.g., condition 216 (FIG. 2C) or the join_cond). If no such row exists (if the join conditions are not satisfied), method 300 proceeds to step 308 where the row is created having a null value for its measures. After step 308, method 300 proceeds to step 310. Returning to the discussion of step 306, if the row does exist, then method 300 proceeds to step 310 (without performing step 308). In step 310, the row found in step 306 or created in step 308 is added to the final result (or output table) that will be presented. In step 312, a determination is made as to whether there are anymore index values for the loop having index II. If there are other index II values, method 300 returns to step 304 to begin another execution of the loop having index II. If there are no more index II values, method 300 proceeds to step 314 to check whether there are any more index I values. If there are more index I values, method 300 proceeds to step 302 to begin another execution of the loop having the I index. If there are no more index I values, method 300 terminates. As indicated by the dots between steps 310 and 312, there may be any number of steps similar to steps 312 and 314, in which each step corresponds to a different loop and each loop corresponds to a different densifying or partitioning dimension.

Thus, to summarize the operation of method 300, the partitioning index, index I, cycles through distinct dimension values I. Additionally, for a particular value of index I, a loop is executed for all of the values II of the densifying dimension, while applying the "if" statement for each value II, which thereby densifies the partition of the fact table having partitioning dimension value I.

In the code for an algorithm for method 300, the "if" statement may be replaced with any statement or group of statements that makes a determination whether the row corresponding the current index value combination exists. In the above example, the outer index may be based on the PRODUCTS dimension. In the above example, the index of the inner loop is the entire set of time_ids.

Using a Skip Scan to Obtain Values

Returning to step 302 of method 300, in an embodiment, if the only indexes that exist use the partitioning dimensions as part of a composite index having other dimensions for the other part of the composite index, a skip scan is used for the partitioning index (e.g., index I) even though the partitioning dimension is not a leading column of the composite index.

During the skip scan, the partitioning dimension of the composite index is accessed for each value of the one or more leading columns. In an embodiment, after finding a first value of a partitioning index, other entries in the index having that value are skipped, until the next highest value is found. After finding the next value of the index, all index values already found are skipped. Repeating this process, for each distinct value of the partitioning index may be found. After finding a new distinct value the partitioning index the partitioning loop is executed. One reason the skip scan may be quicker than a full table scan for some sets for data is because the index is organized in a manner that keeps track of the sequence of the dimension values. The organization of the index values may be taken advantage to determine index combinations that can be skipped. Additionally, the size of the disc space that stores the index is smaller than the size of the disc space upon which the full table is stored, and the smaller disc space has a faster access time.

By using the skip scan, only one dimension of a composite index needs to be used for partitioning the fact table. Also by using the skip scan, a dimension may be used as an index that would otherwise require a table scan (e.g., the DISTINCT construct) to find all rows corresponding to any given distinct value of the dimension. Thus, by using the skip scan, at each new value I of the outer loop, a corresponding partition of the fact table (in which the partitioning dimension has dimension value I) is found. In the skip scan the loop is repeated each time a new prod_id encountered for which the loop has not previously been executed.

Specifically, the PARTITIONED OUTER JOIN can be computed by getting, via a skip scan, all the distinct prod_id values using the index. Then, the tuple consisting of each prod_id value and time_id, where the time_id value from the TIMES table as index II, is used for scanning the SALES table. For each combination of index values I and II, the statements within the two nested loops determine if there exists a matching row with corresponding prod_id and time_id values, and if a matching row, is found it returned. Otherwise, if no matching is returned, a dummy row is generated.

Splitting the Fact Table into Partitions

Figure 4:
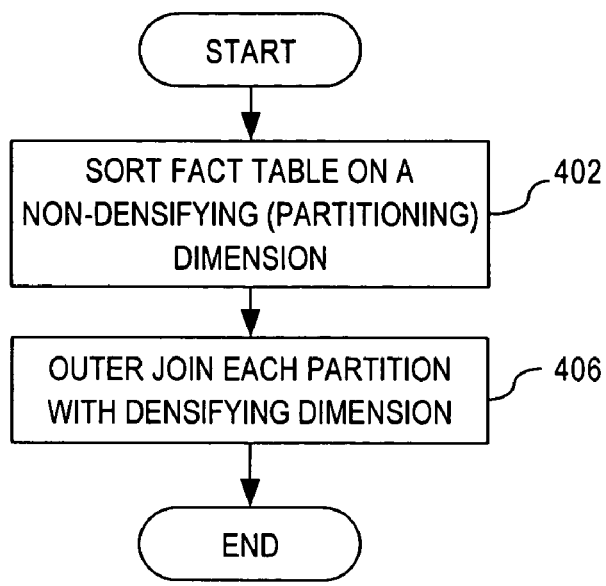
FIG. 4 is a flowchart showing another example of a method for implementing the PARTITIONED OUTER JOIN of FIG. 2C.

FIG. 4 shows a flowchart for a second method, method 400, of performing a PARTITIONED OUTER JOIN, in which the target table is split into partitions and then each partition is OUTER JOINED, as described below. The splitting of the fact table into partitions does not rely on equijoins or indexes and therefore may be more flexible than the other two methods, but may also be less efficient in some situations.

In step 402, a target table is sorted on a dimension other than the dimension with respect to which the data is being densified. The target table may be a fact table or any other table. For example, the target table may be a virtual table in which the rows are produced by an expression of database statements. The sorting of the target table (e.g., the SALES table) has the effect of splitting the target table into partitions in which each partition corresponds to a different dimension value (e.g., prod_id) upon which the target table was sorted. Method 400 requires support for detecting and handling the ends of the partitions. Therefore, the dimension value of the partitioning dimension of a row may be compared against the current partition value, to determine if the partition boundary has been passed.

Next, in step 404, each partition is OUTER JOINed with the dense dimension table (e.g. the TIMES table). Outer joining the partitions with the dense dimension involves taking a row of the dense dimension table (e.g. a TIMES row), and then, matching it with rows in each partition. If there is no match, a dummy row corresponding to the given dimension value combination (e.g., prod_id, time_id) is created. The densification by splitting the target table of method 400 is flexible, and may be used when there are non-equiconditions (i.e., conditions that are not equality) in the ON clause. In addition to being useable for nonequjoins, method 400 does not require use of an index. In an embodiment, method 400 may be used to densify with respect to multiple dimensions. The output of step 404 is also partitioned. Consequently, using the output of the last application of step 404, and repeating the step 404 with respect to a second dimension will densify the data with respect to the second dimension. Thus, step 404 may be repeated any number of times to densify with respect to multiple dimensions.

Sort Merge Partitioned Outer Join

Figure 5:
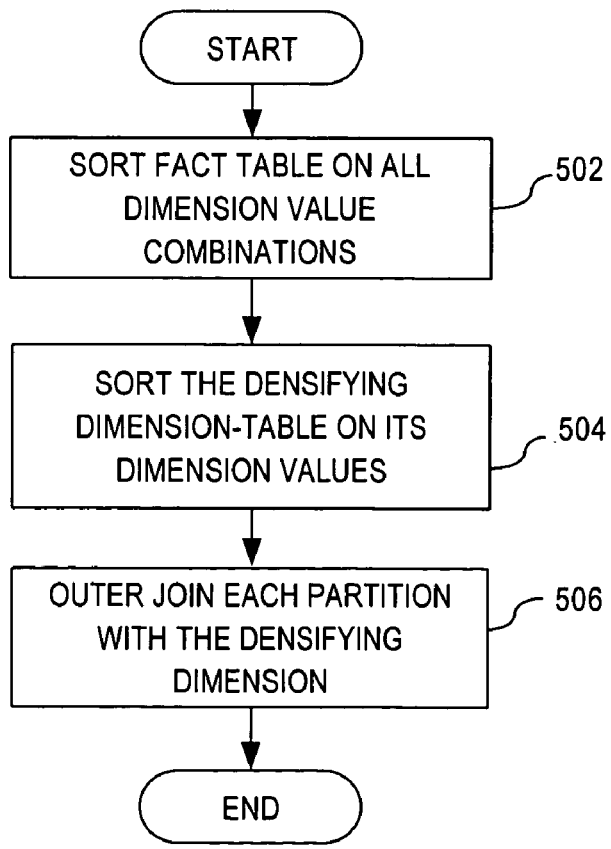
FIG. 5 is a flowchart showing another example of a method for implementing the PARTITIONED OUTER JOIN of FIG. 2C.

FIG. 5 is a flowchart of a third method, method 500, of performing the PARTITIONED OUTER JOIN, which may be referred to as Sort Merge Partitioned Outer Join. A sort merge join within each partition is performed, which is described below. The sort merge join does not require an index, and also uses an equijoin.

In step 502 of the Sort Merge Partitioned Outer Join, the target table (e.g., the SALES table) is sorted with respect to all of its dimensions. (e.g., prod_id, time_id). The densifying dimension is sorted last so that the data is divided into partitions in which in each partition there is no more that one dimension value for each of the dimension values of the densifying dimension. All other dimensions become partitioning dimensions. The sorting of all of the partitioning dimensions has the effect of partitioning the target table. Then, each partition of target table (e.g., SALES table) corresponds to a different combination of dimension values. In other words, there will be one partition for each unique combination of partitioning dimension values. Additionally, each partition will only have one combination of partitioning dimension values. For example, assume the SALES table has dimensions TIMES having values of time_id, PRODUCTS having values prod_id, and REGION having values regn_id. Also assume that there are only two prod_id two values, "1" and "2", there are only two regn_id values, "1" and "2", and there are only three time_id values, "8", "9", and "10". Then, after sorting on all three dimensions there will be four partitions. Using tuples (prod_id, regn_id, time_id), one partition will include tuples (1, 1, 8), (1, 1, 9), and (1, 1, 10). A second partition will include tuples (1, 2, 8), (1, 2, 9), and (1, 2, 10). A third partition will include tuples (2, 1, 8), (2, 1, 9), and (2, 1, 10). Finally, a fourth partition will include tuples (2, 2, 8), (2, 2, 9), and (2, 2, 10).

Next in step 504, the densifying dimension table (e.g., the TIMES table) for the densifying dimension is sorted on its dimension values (e.g., time_id). In step 506, each row within each partition of the target table (e.g., of the SALES table) is individually joined with sorted densifying dimension table (e.g. the TIMES table). The column of the sorted target table that includes the densification dimension (e.g., TIMES) may be used as a key when joining the rows of the target table to the dimension table, which may be referred to as a join key. If a match is not found, a dummy row is returned. Since all dimensions have been sorted, all dimension values are ordered. Thus, by comparing successive values of the join key, a determination can be made whether the end of the partition has been reached. Alternatively, the end of a partition may be detected by detecting a change in a dimension value combination having one dimension value for each of the partitioning dimensions. Once the end of a partition is reached and the end of the index corresponding to the desnifying dimension is reached, then the loop for the densifying dimension values is repeated for the next partition. The joining of the individual rows of the target table to the dimension being densified may be performed by placing an "if statement" or "if block" in a loop having an index corresponding to the densifying dimension. Alternatively, since the densifying dimension table (e.g., the TIMES dimension table) was sorted, a cursor may be advanced through the densifying dimension table to the next row of the densifying dimension table after each check of the join condition on a row of the target table (e.g., a SALES table).

In an embodiment of the sort merge partitioned outer join, the cursor for the join key index is moved to the next row every time the equality condition of an equijoin is met, which is every time the dimension key of the densifying dimension table is equal to the join key of the sorted target table. In an embodiment using an index, the cursor for the join key is advanced to the next row every time the index is equal to the join key. Consequently, in this embodiment, there may not be any necessity for the cursor to be moved back to a position that it was already advanced beyond. However, in alternative embodiments, a nonequijoin may be used, but an algorithm is included for positioning the cursor, allowing the cursor to be placed on the same join key for two different values of the densifying dimension or moved backwards.

Optimizer

Figure 6:
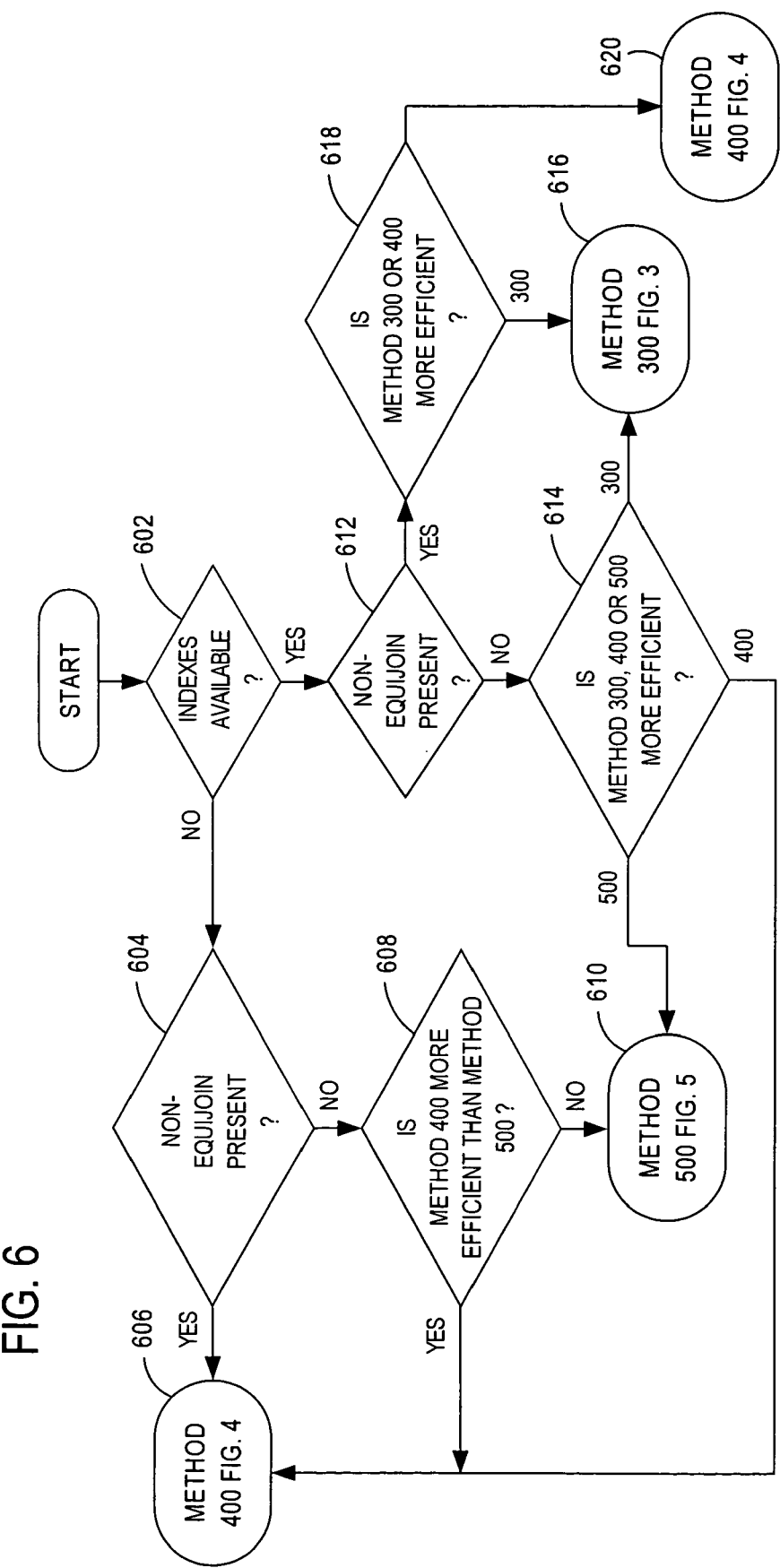
FIG. 6 is a flowchart of a method of the operations of an optimizer that may be included in a relational database management system capable of running the PARTITIONED OUTER JOIN of FIG. 2C.

FIG. 6 is a flowchart of a method 600 of the operations of an optimizer that may be included in a relational database management system capable of running the PARTITIONED OUTER JOIN. In an embodiment, an optimizer is included in the relational database management system running the PARTITIONED OUTER JOIN. The optimizer decides between various methods of performing a variety of different operations based on the computing cost of each method for the set of tables and the statements on which the operations are being performed. In an embodiment, the optimizer decides upon a method for performing a PARTITIONED OUTER JOIN based on which method is most efficient.

For example, in step 602 the optimizer may first check if there are indexes available for the dimensions of the target table, if a partitioning or densifying dimension does not have an available index, method 300 cannot be used, and method 600 proceeds to step 604. In step 604, a determination is made whether a nonequijoin is present. If a nonequijoin is present, then method 500 cannot be used, so method 600 proceeds to step 606 where method 400 implements the splitting of the table method of FIG. 4.

Returning to the discussion of step 604, if there are no nonequijoins, method 600 proceeds to step 608, where a decision is made whether method 400 or method 500 is expected to be more efficient. If method 400 is expected to be more efficient, then method 600 proceed to step 606. If method 500 is expected to be more efficient, then the method proceeds to step 610, where the Sort Merge Outer Join of method 500 is implemented.

Returning to the discussion of step 602, if indexes are present, all three methods can still be used, and the method proceeds to step 612. In step 612 (similar to step 604), a determination is made whether there are any nonequjoins present. If a nonequijoin is present, then method 500 cannot be used, so method 600 proceeds to step 614, where a determination is made whether method 300, 400, or 500 is expected to be more efficient. If method 500 is expected to be more efficient, method 600 proceeds to step 610. If method 400 is expected to be more efficient, method 600 proceeds to step 606. If method 300 is expected to be more efficient, method 600 proceeds to step 616, where the nested loop outer join of method 300 is implemented.

Returning to the discussion of step 612, if a nonequijoin is present, the Sort Merge Outer Join cannot be used, and method 600 proceeds to step 618. in step 618, a determination is made whether methods 300 or 400 are expected to more efficient. If method 300 is expected to be more efficient, method 600 proceeds to step 616 where method 300 is implemented. If method 400 is determined to be more efficient, then method 600 proceed to step 620 where method 400 is implemented.

In an embodiment, the optimizer may choose between other methods of performing the PARTITONED OUTER JOIN in addition to or instead of any one of or any combination of methods 300, 400, and 500. In an alternative embodiment, only one of methods 300, 400, or 500 of performing the PARTIONED OUTER JOIN is included or only two of methods 300, 400, or 500 are included in the relational database, and if the one or the two methods included cannot be applied, the PARTIONED OUTER JOIN is not performed.

Optimizations and Enhancement for Partitioned Outer Join

Optimizations normally used with JOINs and OUTER JOINs can also be used with the PARTITIONED OUTER JOIN. For example, predicate pushing, and partition pruning may also be used with the PARTITIONED OUTER JOIN. Regarding predicate pushing, only those predicates that are defined over the partitioning expressions should be pushed down or up for a view. In other words, if a predicate imposes a condition that limits the output to a certain set of dimension values, the program applies that predicate while performing the initial calculations so that unnecessary calculations related to dimension values that are not of interest are not performed. Instead of applying the predicate at the point specified, the predicate is applied at one or more points in the program that minimize or at least reduce the amount of calculations that need to be performed to achieve the same result.

For example, given the following query

```
SELECT V1.prod_id, V2.time_id, V1.amount_sold
FROM SALES V1 PARTITION BY (prod_id)
RIGHT OUTER JOIN TIMES V2
    ON (V1.time_id = V2.time_id)
WHERE prod_id in (1, 2, 3);
```

The predicate, prod_id in (1, 2, 3), can be pushed into the table scan of the SALES table as a filter so that only products 1, 2, and 3 of the SALES table are joined with the TIMES table. Consequently, computations will not be performed on other products of the SALES table.

Similarly, for PARTITION pruning, the predicates of an outer query block may be used for pruning an inner query block that is a partitioned operand of PARTITIONED OUTER JOIN. If a portion or partition of the table is not relevant to performing a portion of the calculations, the calculations are not performed on that partition. The example of predicate pushing is also an example of pruning, because all parts of the table that were not relevant to products 1, 2, or 3 were removed from the data under consideration before doing any manipulations on the data of the target table.

The optimizer is also enhanced for estimating the cost and cardinality with PARTITIONED OUTER JOIN. In an embodiment, cost-based optimizations are supported for the PARTITIONED OUTER JOIN.

Parallel Evaluation of Partitioned Outer Join

Partitioned outer Join execution scheme described above is scalable in that each PARTITIONED OUTER JOIN computation is delegated to a set of slaves such that they can each perform the join operation independently of other slaves. In this context, a slave refers to any entity that is capable of processing instructions in parallel to other such entities. For example, a slave may be another processor, process, or thread. To facilitate different slaves to independently process the partitions, the densifying dimension table of the JOIN is broadcast to all of the slaves. The partitioned target table of the JOIN operation may be hash or range partitioned across the processes and/or slaves.

For example, if a computing device has four processors, and the SALES table has 6 products, with product IDs 1-6, the first processor may receive the partitions of the SALES table corresponding to product IDs 1 and 2, the second processor may receive a copy of the partitions corresponding to product IDs 3 and 4, the third processor may receive the portion of the product table corresponding to product ID 5, and the fourth processor may receive the portion of the SALES table corresponding to product ID 6. However, each of processors 1-6 will receive the entire TIMES table. Consequently, each slave and/or process has access to the entire dimension table and the partitions of the target table that it needs to perform the PARTITIONED OUTER JOIN operation for its slice of the partitioned table. The first processor may first OUTER JOIN the partition of product ID # 1 and then may OUTER JOIN the partition of product ID # 2. In parallel to the operations of the first process, the second processor may first OUTER JOIN the partition of product ID # 3 and then may OUTER JOIN the partition of ID # 4. Simultaneously, the third processor may OUTER JOIN the product ID # 5 partition. Also in parallel, the fourth processor may OUTER JOIN the product ID # 6 partition.

For example, consider the statement:

```
SELECT V1.prod_id, V2.time_id, V1.amount_sold
FROM SALES V1 PARTITION BY (prod_id)
RIGHT OUTER JOIN TIMES V2
ON (V1.time_id = V2.time_id);
```

In this case, the non-partitioned dimension table "TIMES" may be broadcast to all of the slaves, and the partitioned target table "SALES" may be hash or range partitioned based on the partitioning columns (e.g., prod_id). In other words, in this example, a different slave may work on each prod_id into which the table is partitioned. Each slave has access to the entire TIMES table and some partitions of the SALES table identified by the prod_id. Each slave can therefore perform its portion of the PARTITIONED OUTER JOIN independent of other slaves. The partitioning scheme used to partition the partitioned table on the partitioning columns may be hash or range partitioned.

Alternative Embodiment

Instead of a PARTITIONED OUTER JOIN, a construct may be used that is tailored for desifying. For example a construct for desifying may have the following syntax:

DENSIFY (table_reference[, table reference] . . . ) BY (densifying_expr[, densifying_expr] . . . )
USING (dimension_expr[, dimension_expr] . . . )

In an alternative embodiment, the densifying construct may have the following syntax:
DENSIFY (table_reference[, table reference] . . . , dimension_expr[, dimension_expr] . . . ) BY (densifying_expr[, densifying_expr] . . . )

In the above statements, table_reference is a reference to the target table, and dimension_expr is a column or an expression that evaluates to a virtual column that is used as a dimension, where a virtual column is a set of numbers having one number for each row of the table. Similarly, the densifying_expr is the dimension or virtual dimension with respect to which the data is densified. In an embodiment, the dimension_expr need not actually be used for partitioning the data, but is used as a nondesifying dimension, when densifying. In other words, the table produced by the densifying construct will have one row for the cross product of each value of the densifying dimension and each distinct value of the partitioning dimension. As indicated by the square brackets and ellipses, any number of tables having the same dimensions may be denisfied by the same statement, the tables may have any number of densifying dimensions, and any number of other dimensions, as long as there is at least one other dimension in addition to the densifying dimension.

As an example, suppose SALES table includes only tuples (regn_id, prod_id, time_id) for dimension value combinations (1, 1, 1) and (1, 2, 1), and the TIME table includes time_ids 1 and 2. Then DENSIFY (SALES) BY (time_id) USING (prod_id) will result in a SALES table having rows for dimension value combinations (1, 1, 1), (1, 2, 1), (1, 1, 2) and (1, 2, 2). In contrast, DENSIFY (SALES, regn_id) BY (time_id) will result in a SALES table having rows for dimension value combinations (1, 1, 1), (1, 2, 1), and (1, 1, 2).

Hardware Overview

Figure 7:
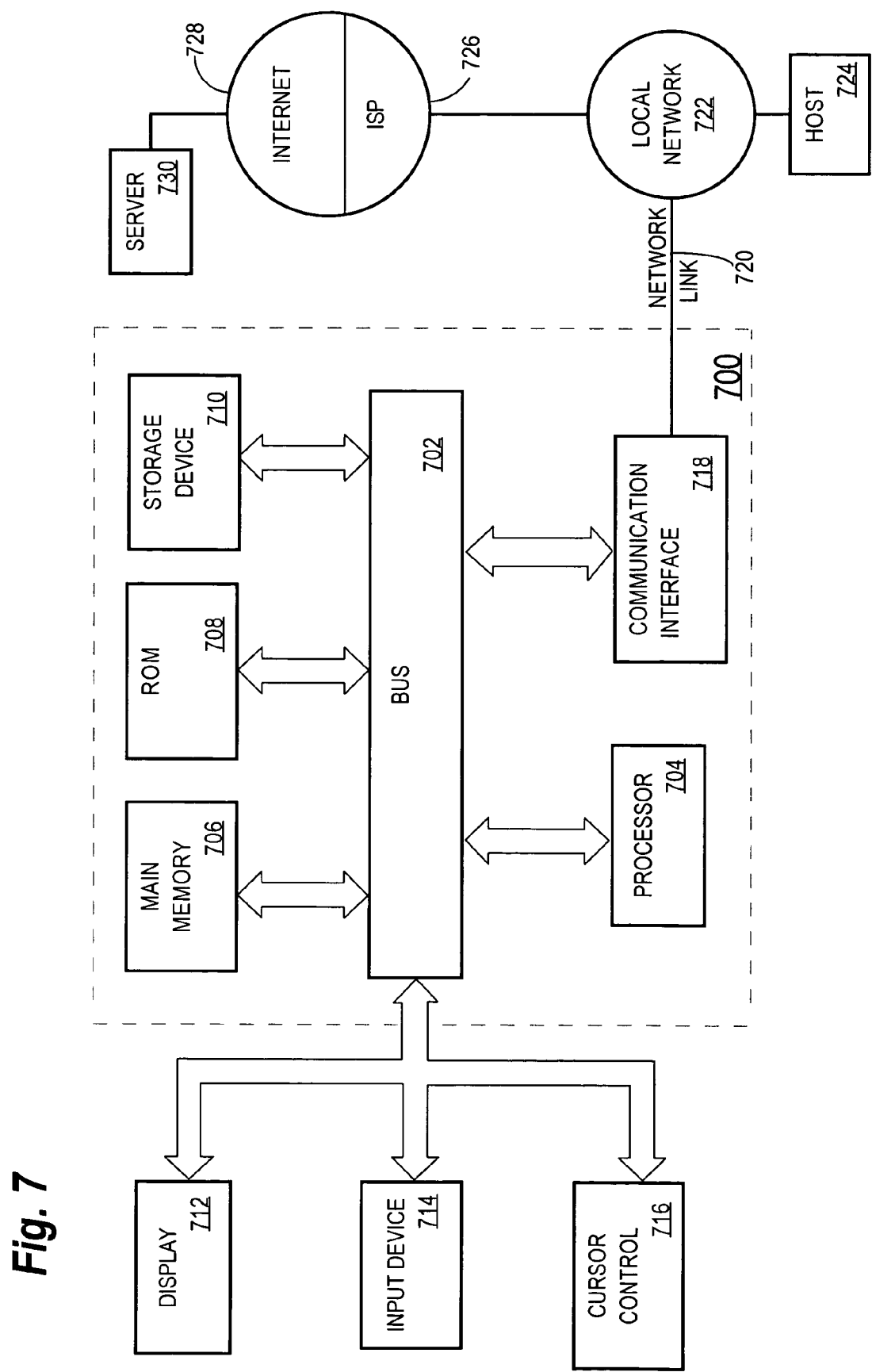
FIG. 7 is a block diagram that illustrates a computer system 700 upon which an embodiment of the invention may be implemented.

FIG. 7 is a block diagram that illustrates a computer system 700 upon which an embodiment of the invention may be implemented. The invention may be implemented on many different types of machines. Computer system 700 is just one example of such a machine. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Since compute system 700 is just one example of a machine, and computer readable media is just one example of a "machine-readable medium." Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704. For example, the instructions for implementing the construct for a partition or for densifying data may be stored in main memory to 706 and/or carried by any of the computer-readable media described herein.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method comprising the steps of:

generating, based on a first set of data associated with a plurality of dimensions, a second set of data; and storing said second set of data in a volatile memory or a non-volatile memory;

wherein the first set of data is not dense relative to a first dimension of the plurality of dimensions; wherein the second set of data is dense relative to the first dimension;

wherein the first set of data includes a plurality of subsets of data and each of the subsets of data is a partition of the first set of data, and is associated with a single dimension value selected from one dimension of the plurality of dimensions;

wherein the step of generating includes separtely performing, for each particular subset in the plurality of subsets, a mini join operation that involves an outer join between a third set of data and the particular subset; and wherein separately preforming the mini join operation for each particular subset in the plurality of subsets generates the second set of data.

2. The method of claim 1, wherein the first set of data includes rows that are associated with dimension value combinations in which the dimension value combinations are combinations of dimension values selected from the plurality of dimensions,
 wherein the second set of data includes coffesponding rows for the dimension value combinations that correspond to the rows of the first set of data,
 wherein the corresponding rows are associated with the dimension value combinations, and
 wherein the step of generating comprises the steps of
  checking if a corresponding row exists in the second set of data for a set of dimension value combinations, wherein the set of dimension value combinations is dense with respect to one dimension; and
  creating the row if the corresponding row does not exist.

3. The method of claim 2, wherein the step of checking is performed within a set of nested loop instructions that perform one loop for each dimension value combination of the set of dimension value combinations.

4. A volatile or non-volatile machine-readable medium carrying one or more sequences of instructions, which when executed by one or more processors, causes the one or more processors to perform the method recited in claim 3.

5. A volatile or non-volatile machine-readable medium carrying one or more sequences of instructions, which when executedby one or more processors, causes the one or more processors to perform the method recited in claim 2.

6. The method of claim 1, wherein each of the subsets of data is a single row of data.

7. A volatile or non-volatile machine-readable medium carrying one or more sequences of instructions, which when executed by one or more processors, causes the one or more processors to perform the method recited in claim 6.

8. The method of claim 1, wherein the step of generating is performed in response to detecting a data manipulation language statement.

9. A volatile or non-volatile machine-readable medium carrying one or more sequences of instructions, which when executed by one or more processors, causes the one or more processors to perform the method recited in claim 8.

10. The method of claim 1, wherein the step of generating includes performing the outer join on a first subset using a first processor and performing the outer join on a second subset using a second processor that is different than the first processor.

11. The method of claim 10, wherein the outer join is a right outer join.

12. The method of claim 10, wherein the outer join is a left outer join.

13. A volatile or non-volatile machine-readable medium carrying one or more sequences of instructions, which when executed by one or more processors, causes the one or more processors to perform the method recited in claim 2.

14. A volatile or non-volatile machine-readable medium carrying one or more sequences of instructions, which when executed by one or more processors, causes the one or more processors to perform the method recited in claim 11.

15. A volatile or non-volatile machine-readable medium carrying one or more sequences of instructions, which when executed by one or more processors, causes the one or more processors to perform the method recited in claim 10.

16. The method of claim 1, wherein the step of generating is performed by an SQL engine.

17. A volatile or non-volatile machine-readable medium carrying one or more sequences of instructions, which when executed by one or more piocessors, causes the one or more processors to perform the method recited in claim 16.

18. The method of claim 1, wherein the step of generating includes receiving an expression that indicates a partitioning key for partitioning the first set of data.

19. A volatile or non-volatile machine-readable medium carrying one or more sequences of instructions, which when executed by one or more processors, causes the one or more processors to perform the method recited in claim 18.

20. The method of claim 1, wherein the outer join is associated with join conditions that includes a Boolean expression.

21. A volatile or non-volatile machine-readable medium carrying one or more sequences of instructions, which when executed by one or more processors, causes the one or more processors to perform the method recited in claim 20.

22. The method of claim 1, wherein said first set of data includes a first set of rows; and
 wherein said outer join is between said first set of rows and a second set of rows, and the step of generating includes sending each of a plurality of processes a subset of said first set of rows and all of said second set of rows.

23. The method of claim 22 wherein the generating includes specifying at least one dimension of the plurality of dimensions, and hash partitioning the first set of data with respect to the dimension specified.

24. A volatile or non-volatile machine-readable medium carrying one or more sequences of instructions, which when executed by one or more processors, causes the one or more processors to perform the method recited in claim 23.

25. A volatile or non-volatile machine-readable medium carrying one or more sequences of instructions, which when executed by one or more processors, causes the one or more processors to perform the method recited in claim 22.

26. The method of claim 1, further comprising:
 detecting a construct that includes a condition limiting which dimension value combinations are included in the second set of data; and
 in response to detecting the other construct, performing the operation only with respect to the dimension value combinations to which the second set of data was limited.

27. A volatile or non-volatile machine-readable medium carrying one or more sequences of instructions, which when executed by one or more processors, causes the one or more processors to perform the method recited in claim 26.

28. The method of claim 1, wherein the first set of data is associated with a plurality of dimensions, the second set is associated with the plurality of dimensions, and the second set of data is denser with respect to one of the plurality of dimensions.

29. A volatile or non-volatile machine-readable medium carrying one or more sequences of instructions, which when executed by one or more processors, causes the one or more processors to perform the method recited in claim 28.

30. A volatile or non-volatile machine-readable medium carrying one or more sequences of instructions, which when executed by one or more processors, causes the one or more processors to perform the method recited in claim 1.

31. A system comprising:
one or more processors; and
a volatile or non-volatile machine-readable medium carrying one or more sequences of instructions, which when executed by the one or more processors, causes the one or more processors to perform the method recited in claim 1.

32. The method of claim 1, wherein:
the first set of data comprises a plurality of rows;
each row in the plurality of rows comprises at least (a) a value from the first dimension, (b) a value from a second dimension of the plurality of dimensions, and (c) a value from a third dimension of the plurality of dimensions;
the first set of data comprises a particular row that comprises a first value from the first dimension, a second value from the second dimension, and a third value from the third dimension;
the first set of data lacks any row that comprises each of: (a) a fourth value from the first dimension, (b) the second value, and (c) the third value; and
for each combination of values, from the second and third dimensions, that is also in a row in the plurality of rows, and for each particular value in the first dimension, the second set of data comprises at least one row that comprises both (a) that combination of values from the second and third dimensions and (b) that particular value in the first dimension.

33. A volatile or non-volatile machine-readable medium carrying one or more sequences of instructions, which when executed by one or more processors, causes the one or more processors to perform the method recited in claim 32.

* * * * *

UNITED STATES PATENT AND TRADEMARK OFFICE
CERTIFICATE OF CORRECTION

PATENT NO. : 7,356,542 B2
APPLICATION NO. : 10/796217
DATED : April 8, 2008
INVENTOR(S) : Gupta et al.

It is certified that error appears in the above-identified patent and that said Letters Patent is hereby corrected as shown below:

On page 2, in column 2, under "Other Publications", line 11, after "Proceedings" delete "of".

In column 2, line 9, delete ""densified, "" and insert -- "densified," --, therefor.

In column 2, line 32, delete "Calendar" and insert -- calendar --, therefor.

In column 2, line 37, delete "id, "" and insert -- id," --, therefor.

In column 2, line 38, delete "id, "" and insert -- id," --, therefor.

In column 7, line 37, delete "patitioned" and insert -- partitioned --, therefor.

In column 8, line 26, delete "(P 10,-)," and insert -- (P10,-), --, therefor.

In column 8, line 54, delete "T2.c4)." and insert -- T2.C4). --, therefor.

In column 18, line 8, delete "nonequjoins," and insert -- nonequijoins, --, therefor.

In column 19, line 4, delete "desnifying" and insert -- densifying --, therefor.

In column 19, line 65, delete "nonequjoins" and insert -- nonequijoins --, therefor.

In column 20, line 10, delete "in" and insert -- In --, therefor.

In column 20, line 18, delete "PARTITONED" and insert -- PARTITIONED --, therefor.

In column 20, line 22, delete "PARTIONED" and insert -- PARTITIONED --, therefor.

In column 20, line 25, delete "PARTIONED" and insert -- PARTITIONED --, therefor.

In column 21, line 66, delete "desifying." and insert -- densifying. --, therefor.

In column 21, line 67, delete "desifying" and insert -- densifying --, therefor.

In column 22, line 18, delete "nondesifying" and insert -- nondensifying --, therefor.

In column 22, line 24, delete "denisfied" and insert -- densified --, therefor.

In column 24, line 64, in claim 1, delete "separtely" and insert -- separately --, therefor.

In column 25, line 1, in claim 1, delete "preforming" and insert -- performing --, therefor.

In column 25, line 9, in claim 2, delete "coffesponding" and insert -- corresponding --, therefor.

In column 25, line 32, in claim 5, delete "executedby" and insert -- executed by --, therefor.

In column 25, line 59, in claim 13, delete "2." and insert -- 9. --, therefor.

CERTIFICATE OF CORRECTION (continued)
U.S. Pat. No. 7,356,542 B2

In column 25, line 5, in claim 17, delete "piocessors," and insert -- processors, --, therefor.

Signed and Sealed this

Fifth Day of January, 2010

David J. Kappos
*Director of the United States Patent and Trademark Office*